United States Patent [19]

Hartmann

[11] 4,072,656
[45] Feb. 7, 1978

[54] GLYCIDYL ETHERS DERIVED FROM 3,3',5,5'-TETRAALKYL-4,4'-DIHYDROXYBIPHENYL

[75] Inventor: Ludwig A. Hartmann, Wilmington, Del.

[73] Assignee: ICI Americas Inc., Wilmington, Del.

[21] Appl. No.: 689,157

[22] Filed: May 24, 1976

[51] Int. Cl.$^2$ .............................................. C08G 59/24
[52] U.S. Cl. ...................... 260/47 EN; 260/47 EA; 260/348.11; 427/195
[58] Field of Search .......... 260/348 R, 47 EP, 47 EC, 260/47 EN

[56] References Cited

U.S. PATENT DOCUMENTS

| | | | |
|---|---|---|---|
| 2,698,315 | 12/1954 | Greenlee | 260/47 |
| 3,367,911 | 2/1968 | Daum et al. | 260/47 |
| 3,631,208 | 12/1971 | Hay | 260/619 R |

OTHER PUBLICATIONS

Pacquin, "Epoxydverbindungen und Epoxydharze", Springer-Verlag, Berlin, 1958, pp. 256–262.

*Primary Examiner*—Harold D. Anderson
*Assistant Examiner*—E. A. Nielsen

[57] ABSTRACT

Glycidyl ethers prepared from the reaction of 3,3',5,5'-tetraalkyl-4,4'-dihydroxybiphenyl and halohydrin form upon curing resins having high heat distortion temperatures. The ethers have utility in the manufacture of powder coatings, adhesive compositions, laminates and molding compositions.

4 Claims, No Drawings

GLYCIDYL ETHERS DERIVED FROM 3,3',5,5'-TETRAALKYL-4,4'-DIHYDROXYBIPHENYL

FIELD OF THE INVENTION

This invention concerns novel glycidyl ethers and the resins formed therefrom. More particularly this invention concerns novel solid glycidyl polyethers of 3,3',5,5'-tetraalkyl-4,4'-dihydroxybiphenyl and curable compositions obtained therefrom and their use, particularly in the preparation of adhesives, powder coatings, molding compositions and the like.

The invention further provides cured insoluble infusible products having superior heat resistance which products are obtained by heating and reacting the above noted ethers with epoxy resin curing agents.

BACKGROUND

Polyepoxides, such as commercially available glycidyl ethers of polyhydric phenols, have been used with considerable success in the past in the preparation of powder coatings, adhesives and laminates. Their use in these applications, however, has been limited because of the trend toward more heat resistant products, particularly those having high mechanical strength at elevated temperatures, and the preference for those polyepoxides which provide ease and versatility in handling. For example, one drawback of many commercially available epoxy resins has been the fact that, due to the short pot life of the formulated resins, curing agents could not be added to the resin until shortly before use. Additionally the prior art resins frequently suffer from short storage or shelf life. Accordingly, there is therefore a great need for epoxy compositions which not only provide for cured products having high heat distortion temperatures and mechanical strength but which have longer storage or shelf lives and longer pot lives.

It has now been discovered that these drawbacks may be overcome by the new products of the invention. The new ethers may be premixed with curing agents to produce curable compositions having shelf lives which may exceed one year. These curable compositions may be melted to a liquid and used in castings or the manufacture of laminates and as an adhesive or may be used in solid or powdered form for coatings.

SUMMARY OF THE INVENTION

The new glycidyl ethers of the invention are prepared by reacting a 3,3',5,5'-tetraalkyl-4,4'-dihydroxybiphenyl (TADP) with a stoichiometric excess of halohydrin.

Definitions

The glycidyl ethers of the invention can be characterized by their epoxy equivalent and melting points, or melting point ranges. By glycidyl ethers is meant the product of the reaction of TADP and a halohydrin in the presence of a base. By curable composition is meant the blend of the glydicyl ether and a curing agent. By the term "epoxide equivalent," as used herein is meant the weight in grams of glycidyl ether which contains one gram equivalent of epoxy. The method of determining the epoxide equivalent is discussed in Epoxy Resins-Application and Technology by Lee and Neville, McGraw Hill, 1957. By the term "melting points, or melting point ranges," as used herein, is meant the temperature at, or the range of temperatures within which the glycidyl ether transforms from the solid state to the liquid state. Melting point ranges, as used herein were determined by capillary melting point method.

Disclosure

Many methods are known in the art for preparing glycidyl ethers. They can be advantageously prepared by the reaction of halohydrins with polyhydric phenols. The starting compounds necessary to prepare the products of the present invention are biphenols having the following formula,

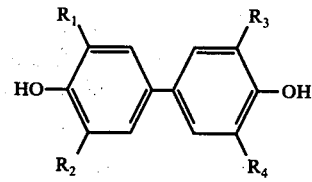

where $R_1$, $R_2$, $R_3$, $R_4$, are alkyl whether straight or branched chain and may be the same or different.

As used herein, the term alkyl refers to any monovalent radical derived from a saturated aliphatic hydrocarbon by removal of one hydrogen atom therefrom. The term includes both straight chain and branch chain materials containing from 1 to about 12 carbon atoms. Preferred results are achieved with the alkyl substituents containing from 1 to about 5 carbon atoms. The polyhydric phenols used as starting compounds in the present invention preferably are symmetrical biphenols — i.e. those in which the substituent $R_1$ equals $R_3$ and $R_2$ equals $R_4$. A specific starting compound which is particularly preferred is tetramethylbiphenol (TMBP). Other biphenols which may be useful include those where the alkyl substituent may be ethyl, propyl, isopropyl, tertiary butyl, secondary butyl or amyl. Blends of different biphenols having the above formula may also be used.

The biphenol starting materials used to prepare the products of the invention may be prepared by the oxidative coupling of alkyl phenols such as 2,6-xylenol. Detailed procedures of a useful oxidative coupling synthesis are disclosed in U.S. Pat. No. 3,804,865 and U.S. applications Ser. No. 500,210 filed Aug. 23, 1974, and Ser. No. 499,826 filed Aug. 23, 1974.

Typical halohydrins which can be reacted with the biphenol to prepare the glycidyl ethers are polyhalohydrins, eg, glycerol dichlorhydrin, bis(3-chloro-2-hydroxypropyl) ether, bis(3-chloro-2-methyl-2-hydroxypropyl) ether, 2-methyl-2-hydroxy-1,3-dichloro-propane, 1,4-dichloro-2,3-dihydroxybutane, and epihalohydrins such as epichlorohydrin which is preferred.

An advantageous method for the preparation of the glycidyl ethers of the invention is to heat a dihydric phenol with epichlorohydrin in the presence of sufficient caustic alkali or other strong alkali, eg, potassium hydroxide, to combine with the chlorine of epichlorohydrin. It is preferable to use an amount of alkali at least equivalent to the amount of dihydric phenol so as to insure the complete reaction of chlorine.

The glycidyl ethers formed by the reaction have the following general structures;

Diglycidyl Ether

-continued

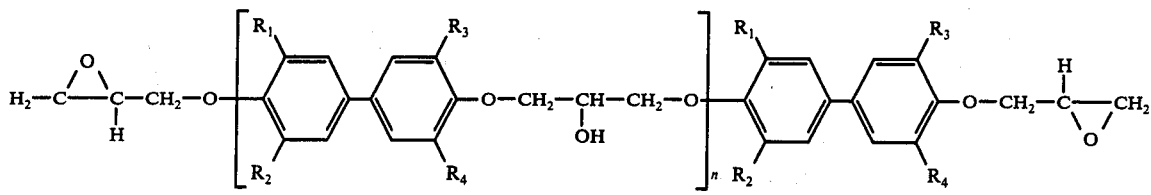

and

Monoglycidyl Ether

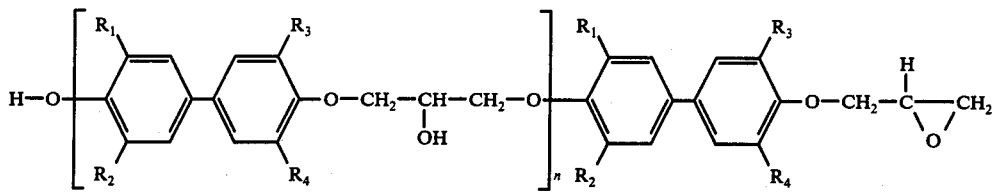

wherein $R_1, R_2, R_3,$ and $R_4$ have the above noted values and $n$ may be zero or an integer. Theoretically, 1 mol of epichlorohydrin will react with 1 hydroxyl group of polyhydric phenol to form a glycidyl ether. For example, 2 mols of epichlorohydrin are theoretically required to react with 1 mol of a dihydric phenol to form the diglycidyl ether of the phenol. In practice, however, a higher ratio than 2 mols of epichlorohydrin per mol of dihydric phenol is desirable, particularly to form lower MW glycidyl ethers. Molar excesses of up to 14 mols of epichlorohydrin per mol of dihydric phenol may be utilized to form the glycidyl ether of the phenol. The value of $n$ and extent of polymerization can be varied by changing the mol ratio of epichlorohydrin to dihydric phenol within the range of 14-1 to 2-1. Thus by decreasing the mol ratio of epichlorohydrin to dihydric phenol from 14 towards 2, glycidyl ethers having higher values of $n$ and higher epoxy equivalents can be obtained. Molar ratios in excess of 14:1 are economically not worthwhile since the yield of lower MW glycidyl ethers is not further substantially improved. Molar ratios of less than 2:1 tend to produce products having epoxide equivalents too high to have commercial potential. The reaction can be carried out by adding the dihydric phenol, epichlorohydrin and alkali or aqueous alkali together; by adding epichlorohydrin to a mixture of dihydric phenol and alkali; by adding a mixture of dihydric phenol and alkali to epichlorohydrin; or by adding alkali in stages to a mixture dihydric phenol and epichlorohydrin; or by other methods. To prepare diglycidyl ethers in a system having a water content of approximately 1-10 percent has been found to be most preferred to prevent undue hydrolysis of the epoxy groups. To minimize the water content of the system the alkali component may be added in the solid form or alternatively, any excess water may be removed from the system by azeotropic means. In instances where a small excess of the epichlorohydrin reactant is desirable the reaction mixture may be too viscous to react adequately. In such instances it is suggested to include an organic solvent for the biphenol. Such a solvent should be polar in nature and should be substantially inert in a basic medium. Suitable organic polar solvents include dioxane, dimethyl acetamide (DMAC), methyl isobutyl ketone (MIBK), methyl ethylketone. (MEK).

Although the reaction proceeds exothermically, the reaction temperature can be preferably controlled at from 25° to 100° C. by regulating either the amount of water in the aqueous alkali added or, if anhydrous or substantially anhydrous alkali is used, by cooling the walls of the reaction vessel with a circulating cooling medium or by any other suitable cooling means. Toward the end of the reaction the addition of heat may be required to maintain the temperature of the reaction mixture at the desired level within a range from 50° to 100° C. The overall reaction time can be made to vary from 30 minutes to 3 or more hours depending upon the temperature, proportion of reactants and method of mixing the reactants. When the reaction is concluded the excess epichlorohydrin may be removed by distillation in vacuum. The residue can then be freed from the sodium chloride formed as a by-product of the reaction. This can be accomplished by dissolving in a suitable inert solvent such as, benzene, toluene, xylene and the like followed by extraction with water or by filtration and distillation of the solvents.

Sodium chloride may also be separated from the reaction mixture by filtration prior to vacuum stripping of epichlorohydrin. When using an aqueous medium for reaction, particularly for the synthesis of higher MW homologs, the product may separate into an aqueous phase and a product phase. By-product salt may be removed by discarding the aqueous layer and washing the product with hot water at the softening point of the glycidyl ether. If the softening point is above the boiling point of water the glycidyl ether may be dissolved in a water-immiscible solvent, such as toluene or chloroform, and washed with water. In this water wash, dilute acids such as acetic acid or hydrochloric acids may be used to neutralize any alkali remaining. Inasmuch as alkali and basic salts, such as sodium acetate tend to induce further polymerization upon the application of heat, it is advantageous to remove substantially all of these impurities by washing or other means.

Separation by fractional distillation under reduced pressure is a particularly satisfactory means for removing the impurities of alkali, salts and other foreign material from glycidyl ether, if the boiling point characteristics of the glycidyl ether permit such a procedure. In this procedure the product of the reaction is dissolved in benzene or some other suitable solvent and washed with water to remove water soluble impurities. The solvent is then stripped off and the product is fractionally distilled in high vacuum to obtain a glycidyl ether which is substantially free of impurities. Preferred solvents for product purification of glycidyl ether have been found to be methanol and acetone. Recrystallization of distilled TMBP glycidyl ether from methanol gave substantially impurity-free diglycidyl ether with a melting range 113°–115° and an epoxide equivalent (WPE) of 185. Since recrystallization of the crude product from an organic solvent is accompanied by loss of some of the diglycidyl ether, a higher yield of less pure diglycidyl ether may be obtained by omitting recrystallization from organic solvents.

A preferred product of the invention is tetramethylbiphenol diglycidyl ether (TMBP-DGE). A by-product of the reaction which may form is monoglycidyl ether (TMBP-MGE) which product although not difunctional has been found to be coreactive with the diglycidyl ether to improve the flexural strength of cured products. In view of its flexural strength modifying capabilities it may be desirable to prepare monoglycidyl ether separately, particularly since during recrystallization of the impure diglycidyl ether it is cumbersome to separate the other impurities such as oligomers and excess epichlorohydrin from the monoglycidyl ether. Monoglycidyl ether formation may be favored by increasing the amount of water present during the reaction. A water content of more than 40% by weight of the system ensures substantial formation of monoglycidyl ether. A water content of 50% by weight results in a product of about 80% pure monoglycidyl ether which may be further purified by well known extraction procedures.

The products of the invention may be reacted with a variety of extenders to form higher molecular weight prepolymers. Extenders that are useful may be any polyfunctional monomer reactive with the glycidyl ether and include aromatic anhydrides, aromatic diamines and aromatic dihydroxy compounds. The reaction may be catalyzed if necessary and should be conducted at moderate temperatures of from about 80° to 150° C to avoid gelation.

The amount of extender required will depend on the molecular weight desired. To avoid gelation, however, it is suggested to limit the amount of highly reactive extenders to about 20% by weight.

CURING AGENTS

While the glycidyl ethers may be successfully cured with a variety of curing agents such as aliphatic secondary amines, aromatic amines or anhydrides and the like, bifunctional aromatic amines are preferred to obtain the highest heat distortion temperatures. Although such temperatures will vary depending on the ratio of glycidyl ether to curing agent, and the extent of the curing cycle, for best results, it is suggested to use the aromatic diamines generally in an equivalent ratio of 0.5 to 1.5. Specific curing agents to obtain high heat distortion temperatures of the resulting products are 4,4'-methylene dianiline (MDA) and m-phenylenediamine.

While the above noted curing agents are preferred other curing agents that may be utilized include other amines, amino-containing polymers, polybasic acids, acid anhydrides, mercaptans, hydrazines, BF$_3$-complexes and the like and mixtures thereof. Specific examples of such materials include, among others p-phenylenediamine, diaminodiphenylsulfone, triaminobenzene, 2,4-diaminotoluene, tetraaminobenzene, 3,3'-diaminodiphenyl, 1,3-diamino-4-isopropylbenzene, 1,3-diamino-4,5-diethylbenzene, diaminostilbene, triethyl amine, ethylene diamine, diethylamine, diethylenetriamine, tetraethylenepentamine, pyridine, diaminopyridine, piperidine, and the like. Examples of acid anhydrides include phthalic anhydride, succinic anhydride, dodecenylsuccinic anhydride, maleic anhydride, tetrahydrophthalic anhydride, pyromellitic anhydride, chlorendic anhydride, methyl nadic anhydride, and anhydrides obtained by reacting maleic anhydride with unsaturated compounds such as oils, long chain unsaturated acids and the like as well as anhydrides obtained by reacting long chain acids with an acidic anhydride and the like.

Still other examples include the salts, such as magnesium perchlorate, zinc fluoroborate, potassium persulfate, copper fluoroborate, cupric arsenate, zinc persulfate, cupric fluorosilicate, cupric iodate, cupric sulfate, magnesium sulfate, stannic fluoride, zinc nitrate and the like as well as the chloride derivitives as aluminum chloride, zinc chloride, ferric chloride and the like.

As is well known in the art curing cycles have various effects on properties and may therefore be selected according to which properties are most desirable. A general range of curing temperatures is 100°–170° C. or higher with preferred curing temperature being between 120°–165° C. Curing times may range from a few hours to about 70 hours. Frequently curing takes place in two stages with a shorter curing time at relatively low temperature followed by a longer curing period at high temperature. This second stage is often referred to as post curing. It is often desirable to shorten the curing times or lower the curing temperatures by use of an accelerator or catalyst. Such catalysts may be present in amount of 0.5 to 3% by weight of the curing agent and may comprise any of the conventionally employed accelerators.

UTILITY

The glycidyl ethers and curable compositions made therefrom are useful in the manufacture of articles such as combs, brush handles, garden furniture, radio cabinet parts, structural parts requiring high heat distortion temperatures, insulation of electrical parts, and protective coatings. The resins can be employed as heat and light stabilizers for chlorine-containing resins and may be employed in the manufacture of such condensation resins as phenol formaldehyde resins, urea-formaldehyde resins and the like to improve the physical properties such as flexibility of such resins. The curable compositions can be cast or molded using simplified procedures to make numerous articles. The compositions can accept large amounts of a variety of fillers which can impart special properties to resins formed therewith. They are particularly useful in making high temperature structural parts for guided missiles and other high speed aircraft, and tools and dies such as those used in the automobile industry for stamping fenders, hoods and other automobile body parts. The curable compositions are also particularly useful in making easily applied protective coatings and can be cured to hard, durable coatings which are tough, chip resistant and resistant to attack by chemicals and which adhere tenaciously to surfaces of a wide variety of materials including glass and metals. The compositions are also useful as bonding agents in making adhesives, abrasive wheels, laminates and the like. The cured resins can be machined and polished to provide articles having various configurations and appealing appearances.

The curable compositions of the present invention show surprising versatility in that they may be melted to provide liquid compositions which may be cooled to room temperature without causing rapid solidification. The liquid so cooled appears to be supercooled since it remains a liquid for a sufficient time (up to a day) to be used as a liquid adhesive before it solidifies. The solidified melt may be remelted for later use. Such versatility allows for example a solid TMBP-DGE premixed with methylene dianiline to be used in many different processes. In addition to a one package solid process in which the adhesive melts, bonds and cures such processes may include; direct use of the melt as a liquid adhesive applied hot (100° C.); direct use of the melt as liquid adhesive supercooled to a temperature between room temperature and 100° C., direct use of the melt as a viscous liquid adhesive after storage at 0° C., use of the solidified melt as a solid adhesive after storage at 23° C. and use of the solidified melt as a ground powder after storage at 23° C.

The solid glycidyl ethers of the invention are particularly suitable for use in the preparation of powdered compositions, for use in molding operations or in fluidized bed systems.

The heat curable powdered compositions are preferably obtained by effecting a dry blending of the glycidyl ether with the curing agents. The blending may be accomplished by utilizing a pebble mill. It is preferred that the composition prior to blending is ground so that particles have a size of approximately 20 mesh. It should be appreciated that the pebble mill process is but one of many grinding processes that may be used. Other useful methods to grind and mix the epoxy resins or curing agents may utilize micropulverizing, ball milling, sand grinding, stirring and high shear mixing.

The compositions should be finely divided powders having a particle size varying from less than 1 micron to about 175 microns. The heat curable compositions of the present invention may be used as molding compositions and can be pressed, extruded or otherwise utilized in the formation of molded plastic articles. In these applications, curing temperatures range from about 100° to 200° C.

The curable composition may also be utilized as powder adhesives or bonding agents to adhere various surfaces such as metal, wood, ceramics, plaster, cement and the like together. In these applications the powdered composition is placed alone or if desired in combination with other liquid adhesive materials between the surfaces to be bonded and heat and pressure is applied for cure.

The compositions are particularly suitable for use in the formation of coatings as by spraying, dipping, etc. onto articles which may themselves be heated and then subjecting the coated product to postcure conditions. The compositions are particularly suited for use in fluidized bed systems for coatings. In this application, additional materials such as filler, thixotropic agents, pigments, accelerators etc. are added to the composition.

Suitable fillers which may be employed as desired include among others, aluminum powder, mica, bentonites, clays, synthetic resins and polymers, rubbers, ignited alumina, short-fiber asbestos, wood flour, carbon black, silicas, zinc dust, talc and the like. A large number of fillers are available commercially in particle sizes from about .1 microns upward.

The quantity of fillers used is dependent upon many factors such as cost, particle size, particle shape, adsorption characteristics, and loading volumes. The light weight fillers such as asbestos and uncompressed mica are employed in ratios below 50 phr (parts per hundred parts of resin) and generally below 35 phr: the medium weight fillers such as talc and powdered aluminum may be employed up to about 150 phr. In general, however, in order to optimize raw materials costs without minimizing coating properties, the ratio of filler to resin ranges from about 10 to about 60 phr.

It is generally desirable although not necessary to employ a thixotropic agent to prevent dripping or sagging at high film build for coating operations where these problems are likely to occur. Any of the thixotropic agents normally used in the art are suitable for use in the present compositions, including silica xerogels, bentonite clays and their derivatives, castor oil derivatives and the like. Since the curable compositions of the invention are normally less viscous at commercially used application temperatures it is frequently possible to avoid the additional thickeners by merely applying the compositions at lower temperatures. Moreover due to the low viscosity of the compositions they are highly suitable for use in making parts of castings due to their excellent flow characteristics which minimize the formation of bubbles in the molds. The compositions are particularly useful for the preparation of electrical pottings and castings. When subjected to prolonged curing temperatures they produce products which are unusually heat resistant. In this application, the composition can be injection molded or poured or otherwise added to the desired mold or casting and then heated to effect full cure.

The normally solid curable compositions of the invention are also used for the preparation of laminates. In this application the sheets of fibrous material may be first impregnated with the compositions of the invention. The sheets of fibrous materials may be impregnated with the compositions if solid by spreading or sprinkling it thereon or if liquid by dipping or otherwise immersing it in the impregnant. A plurality of impregnated articles may be superposed and the assembly may be cured in a heated press under a pressure of about 25-500 or more pounds per square inch. The resulting laminate is extremely strong and resistant against the action of organic and corrosive solvents. The fibrous material used in the preparation of the laminates may be of a suitable material such as glass cloth and matting, paper, asbestos, mica flakes, cotton bats, duck muslin, canvas, synthetic fibers such as nylon, Dacron and the like. It is usually preferred to utilize woven glass cloth that has been given prior treatment with a well known finishing or sizing agent such as vinyl trichlorosilane.

The following examples are presented. The physical properties listed therein were determined in accordance with ASTM testing methods. The following table identifies the testing procedures used in determining the listed physical properties:

TABLE

| PHYSICAL PROPERTY | ASTM TEST PROCEDURE |
|---|---|
| Heat Distortion Temp. ° C. | D-648 |
| Flexural Strength and Modulus | D-790 |
| Impact Resistance | D-256 |
| Tensile Strength and Modulus | D-638 |
| Barcol Hardness | D-2583 |
| Dielectric Constant | D-150 |
| Dissipation Fractor | D-150 |
| Volume Resistivity (ohm-inch) | D-257 |
| Surface Resistivity | D-257 |

TABLE-continued

| PHYSICAL PROPERTY | ASTM TEST PROCEDURE |
|---|---|
| Lap Shear Strength | D-1002 |

Barcol hardness values specified in the examples were obtained through employment of a Barber-Coleman Impressor GYZJ934-1. Viscosity values in the examples were determined with a Brookfield Synchro-lectric Viscometer Model L.V.F. utilizing a #2 spindle at 30 RPM.

EXAMPLE 1

In a 2,000 ml. reaction flask equipped with stirrer, thermometer, and reflux condenser, 181.5 g. (0.75 m) of 3,3',5,5'-tetramethylbiphenol (TMBP) was slurried with 693.7 g (7.5 m) epichlorohydrin under a nitrogen atmosphere. Water 3.75 ml and the first of six portions of 10.5 g. of solid sodium hydroxide (total amount 63.0 g, 1.57 m) was added at room temperature. The temperature was raised to 79° C. and a second portion of sodium hydroxide added at 77° C. The temperature was allowed to rise to 85° C. The remaining four portions of sodium hydroxide were added at 75°-85° C. whenever the slight exotherm subsided. The total time for addition of sodium hydroxide was three hours. After all the sodium hydroxide was added the charge was heated for 1 hour at 83° C. Excess epichlorohydrin was vacuum stripped at a vacuum from 200 mm to 30 mm Hg. The distillation residue was cooled to 55° C. and diluted with 375 ml. benzene. Filtration through Super Cel after 16 hours at room temperature yielded 94.8 g. salt. The filtrate was vacuum stripped at 60° C. and 50-200 mm Hg. with terminal conditions of 100°-105° C. at less than 1 mm Hg. After the charge was cooled to about 80° C., methanol (1325 ml.) was added dropwise while the temperature was gradually allowed to drop. All of the methanol was added when the temperature was at 46° C. at which point the product began to crystallize. Water (260 ml) was then added and the slurry was cooled and maintained for 16 hours at 3° C. The product was filtered and the filter-cake washed with a mixture of 5 parts of methanol and 1 part water, dried at 65° C. at atmospheric pressure and further dried at 70° C. at less than 1 mm. Yield was 81.3%, and the product had an epoxide equivalent of about 190 and a mp of 97°-102° C. The filtrate containing the methanol and water was separately vacuum stripped at 60°-90° C and 20-50 mm Hg followed by additional stripping at 90° C and at less than 1 mm Hg. vacuum to produce a viscous liquid which had an epoxide equivalent of 272.

To determine the physical properties of the ethers when cured the following examples were prepared. Examples 2, 3 and 4 used as glycidyl ether the product prepared according to the procedure of Example 1 which had an epoxide equivalent of 190. Example 5 used as glycidyl ether the noncrystallized, methanol-soluble fraction which had an epoxide equivalent of 272. Each of the four ethers were melted to about 100° C and then mixed with similarly heated curing agents as identified in Table I. The four ether/curing agent mixtures were then cast to yield panels 2¾ inches wide, 5 inches long and ⅛ inch thick by clamping two stainless steel plates (3½ inches × 6¼ inches) together with a U-shaped Teflon polytetrafluoroethylene spacer (⅛ inches thick) in between. The steel/Teflon assembly was preheated at 120° for at least 30 minutes prior to pouring the resin.

The casting experiments are summarized in Table I.

EXAMPLE 6

A glycidyl ether was made according to the procedure of Example 1 but by reacting 545.3g TMBP with 2,081 g epichlorohydrin. The TMBP-epichlorohydrin slurry was reacted with sodium hydroxide (189.6g) at 70°-83° C. for 2 hrs. and then 84°-90° C. for 1.5 hours. The product was cooled and filtered through a half inch layer of SuperCel. A small amount of water (11.3 ml) was separated from the filtrate. The product was vacuum-stripped at 50°-70° C., finally for 20 minutes at 1 mm Hg. Methanol (1500 ml) was added while crystallization took place. After 16 hrs. at 0° C., the product was filtered and washed with chilled methanol (600 ml). The product was dried 23 hrs. at 75° C. under vacuum better than 1 mm. The yield was 73.5% (797.3g). The product melted at 105°-107° C. and had an epoxide equivalent of 187.5.

The resin of Example 6 was heated to about 100° C and blended with similarly heated metaphenylene diamine at a molar ratio of 2.1. A casting was prepared at 100° C., cured for 2 hours at 100° C, 2 hours at 150° C. and 16 hours at 175° C. The resin was tested for various physical properties prior to and after curing and showed the following results as tabulated in Table II.

TABLE I

3×5" CASTINGS OF TMBP-DGE PREPARED ACCORDING TO PROCEDURE OF EX. 1

| Example | Curing Agent | TMBP-Diglycidyl Ether/Curing Agent Mole Ratio | Curing Temp. ° C. | Curing Time | Flexural Strength Yield | Flexural Strength Break | Flex- Mod ×10⁶ | Compression Strength | HDT,C° | Barcol Hard. |
|---|---|---|---|---|---|---|---|---|---|---|
| 2 | MDA* | 2:1 | 120 | 3-4hr | 19,000 | 19,000 | .39 | 30,200 | 147° | 27-29 |
| 3 | MDA | 2:1 | RT 160 | 16 hr 5-6 hr | — | 16,200 | .37 | 29,450 | 180° | 32-33 |
| 4 | MPD** | 2:1 | RT | 16 hr | — | 16,600 | .46 | — | 174° | 27-31 |
| 5 | MDA | 1.3:1 | 120 | 66 hr | 28,500 | 28,100 | .55 | — | 137° | 36-42 |

TMBP Diglycidyl Ethers of examples 2-4 had an epoxy equivalent of 195
TMBP Diglycidyl Ether of example 5 contained 50% of TMBP-MGE and TMBP-Chlorohydroxypropyl ether andhad equivalent of 272
*methylene dianiline
**m-phenylene diamine

TABLE II

| | | |
|---|---|---|
| Prior to Curing | Viscosity at 100° C (cps) | 105 |
| " | Pot Life at 100° C (mins.) | 25 |
| After Curing | Tensile Strength (psi) | 12,700 |
| " | Tensile Modulus (psi × 10⁶) | 2.96 |
| " | Elongation (%) | 1.17 |
| " | Flexural Strength (psi) | 15,000 |
| " | Flexural Modulus (psi × 10⁶) | 0.43 |
| " | Heat Distortion Temp. (° C) | 205 |
| " | Barcol Hardness | 32-36 |
| " | Charpy Impact (ft.-lbs.) | 6.78 |
| " | Arc Resistance (seconds) | 73 |
| " | Dielectric Strength (volts/mil (% of samples failed at 50,000 volts) | 450+ |
| " | Dielectric Constant | 50 |

| | | |
|---|---|---|
| " | Dissipation Factor | 0.023 |
| " | Volume Resistivity (ohm-in.) | $4.55 \times 10^{16}$ |

EXAMPLE 7

To a chemical reactor 20 lbs. of TMBP and 80 lbs. of epichlorohydrin were added under stirring. The resulting solution was heated to 85° C. while maintained under $N_2$. At this temperature a 15 inch Hg vacuum was pulled and refluxing of epichlorohydrin began. Under these conditions and continuous stirring 13.2 lbs. of 50% NaOH solution were added to the reaction mixture in one pound increments over a period of 4 hours. The water from each incremental addition of NaOH solution was removed before the next increment was added.

After all NaOH solution was added the reaction mixture was maintained at 80° C. for 1 more hour after which time it was cooled to 30° C.

To a representative portion of the reaction product 25% of its weight epichlorohydrin and 17% of its weight water were added, stirred well for 5 minutes and left idle for 20 minutes to settle. The overall mixture was separated into an organic (upper) and aqueous (lower) layers. The organic layer was carefully recovered without disturbing the aqueous layer, was washed with two times its weight distilled water, allowed again to separate and recovered again. The washed organic layer was dried by distilling off the last traces of water along with some epichlorohydrin. The dried organic phase was diluted with 75% its weight epichlorohydrin and filtered through Supercel diatomaceous earth. The filtration was collected and the epichlorohydrin was stripped off at 120° C and full vacuum.

The residue constituting the product was a yellowish easy to break or pelletize solid. The yield was found to be 92%. The product was found to have a melting point of 107° C. and an epoxide equivalent of about 184.

A portion of the diglycidyl ether product was cured as follows. The product was first melted and mixed with equivalent amount of methylene dianiline. The mixture then was poured into a Teflon coated steel mold preheated at 100° C. The mold with the sample was kept 16 hours at 55° C, 2 hours at 125° C, 2 hours at 175° C and 4 hours at 200° C. Finally the sample was cooled and released from the mold. The heat distortion temperature of a specimen taken from the above cured sample was measured according to ASTM-D648 test specifications at 264 psi and found to be 203° C.

EXAMPLE 8

TMBP-DGE was prepared according to Example 6. A sample of 325g of this diglycidyl ether was dissolved in boiling methanol (3250 ml) and treated with 0 g activated carbon (Darco G-60) for ½ hour. The product was filtered while hot and purified TMBP-DGE was then crystallized by cooling and storage at 0°. The recrystallized diglycidyl ether was isolated by filtration and washed with methanol (4 × 100 ml). After vacuum drying at 70° the yield was 279.4 g (86%). The product was redissolved in a boiling mixture of acetone (275 ml) and methanol (550 ml) and treated with activated carbon (Darco G-60). Filtration and crystallization as before gave 219 g substantially pure TMBP-DGE, m.p. 110°–114°. After analysis the product had an epoxide equivalent of 186 and 0.06% organic chlorine content.

The product was blended with a stoichiometric amount of methylene dianiline and a casting was prepared at 55° C and cured for 18 hours, 2 hours at 125° C, 2 hours at 175° C and 4 hours at 210° C. The heat distortion test result after curing showed a heat distortion temperature of 223° C.

EXAMPLE 9

Preparation of 3,3',5,5'-tetramethyl-4,4'-biphenol monoglycidyl ether

TMBP (24.2g, 0.1 mole), epichlorohydrin (46.2g 0.5 mole), and 50 ml water were slurried and mixed well under an atmosphere of nitrogen. A solution of 8.2g NaOH (0.205 mole) in 50 ml $H_2O$ was added at 25°–31° in about 30 minutes. The slurry was heated to 80° within 30 minutes and held at 80°–91° for 2.5 hours. After cooling to room temperature, 70 ml toluene was added to the reaction mixture and the aqueous layer separated and discarded. The toluene solution of the product was washed with 4 × 65 ml water and the solvent vacuum-stripped, finally at 60°–70°/0.1 mm. The yield was 31.9g. The product was a light amber resin which solidified on standing. Analysis showed a melting point at 80°–85° C and an epoxide equivalent of 360.

Thirty grams of the product was further purified by dissolving it in 25 ml toluene and washing it with 1 N NaOH solution (4 × 10 ml), followed by water until neutral. Vacuum stripping gave a yield of 71% monoglycidyl ether with a melting point 90°–93° C and an epoxide equivalent of 327.

A sample of 5g of purified monoglycidyl ether was dissolved in 10 ml chlorobenzene and 10 ml cyclohexane was then added. The solution was kept for 0° for several days. Crystalline product was filtered and washed with cold cyclohexane/chlorobenzene (3:2). The yield was 1.7g light yellow powder. The product was analyzed and showed a melting point of 104°–105° and an epoxide equivalent of 309.

TMBP — DIGLYCIDYL ETHER AS EPOXY ADHESIVE

The aluminum strips for standard lap-shear test ASTM D1002-72 were cut from a sheet of 1/32 in. thick aluminum type. The strips, 1×4 inches, were punched to give a 0.281 inch diameter hole one-half inch from one end and centered. The strips were prepared for testing by vapor degreasing and acid etching. For vapor degreasing, the strips were hung by the 0.281 inch hole from a wire above 500 ml trichloroethylene in a 1-liter resin flask equipped with heating mantle and reflux condenser. The strips were vapor degreased for one hour by boiling trichloroethylene in the flask. The strips were cooled to 23° C and removed for acid etching. The strips were acid-etched for 10 minutes in a solution of 27% sulfuric acid, 3% sodium dichromate, and 70% distilled water. The etched strips were rinsed in cool distilled water and then in hot distilled water. They were dried and stored in a desiccator.

The lap-shear samples are prepared by placing resin as set forth in Examples 10–15 on one plate, clamping on the second plate with desired overlap, and curing. After curing or postcuring, the clamps are removed and the specimens ready to test.

To form the adhesive joint, 0.025 to 0.050g adhesive resin was spread with a spatula across the top ½ inch of one metal strip which was pressed together with the top ½ inch of a second strip. The ½ inch overlap was held by pinchclamps and samples cured.

EXAMPLE 10

Use of 85% of stoichiometric amount of curing agent.

22.5 parts 4,4'-methylene dianiline (MDA) (dried) and 100 parts of TMBP-DGE (mol ratio 0.113/0.267, 85% of stoichiometric amount of MDA) were ground in a mortar and stored at room temp. in a desiccator for 2 hrs. Fifty mg. of the formulation was applied to the above described aluminum strips. Bonding was accomplished by curing at 84°-100° (2 hrs.) and 150° (2 hr.). Reduced pressure (15 mm Hg) was applied for 10 min. at 100° (20 minutes after the start of cure). After cure the sample showed a lap-shear strength of 1691 psi.

EXAMPLE 11

Use of 50% of stoichiometric amount of MDA 13.3 parts dry MDA and 100 parts TMBP-DGE (mol ratio 0.067/0.267) were ground in a mortar and stored 50 days at 0°. The samples were applied to aluminum strips and cured for 2 hrs. at 100° C. (including 15 min. at 15 mm Hg) and 2 hrs. at 150° C. After cure the sample showed a lap-shear strength of 1589 psi.

EXAMPLE 12

Use of stoichiometric ratio.

26.4 parts MDA and 100 parts TMBP-DGE (0.13/0.26 molar ratio) were ground in a mortar, stored for 2 months at 0° C. and cured as in Example 11, using a 25 min. vacuum treatment. The sample showed a lap-shear strength of 2078 psi.

EXAMPLE 13

Use of MDA at 20% over stoichiometric amount.

31.7 parts MDA (dry) and 100 parts TMBP-DGE (0.16/0.26 molar ratio) were ground in a mortar and stored for 2 months at 0° C. After similar curing conditions as Example 11 the sample showed a lap-shear strength of 1482 psi.

EXAMPLE 14

Compare Room Temperature Strength Versus 150° C strength.

23.7 parts MDA and 100 parts TMBP-DGE (twice recrystallized, m.p. 113°-115° C) were ground in a mortar and stored at room temperature for 24 hrs. After curing under the conditions of Example 10 the sample was tested at 23° C. and 150° C. and showed lap-shear strengths of 1463 psi and 1300 psi respectively. The results indicate an 89% strength retention at 150° C.

EXAMPLE 15

Use of epoxy adhesive after melting of the formulated blend and re-solidification at room temperature 22.5 parts methylene dianiline and 100 parts TMBP-DGE (0.85/1 amine/epoxide equivalent ratio) were ground in a mortar and stored 408 hrs. at 23° C. The mixture was melted at 90°-96° in a vacuum oven (15 mm Hg) for 1.5 hrs. and cooled rapidly to 23°. It was then stored 840 hrs. at 23° C. in a capped bottle. The solid was applied to acid etched and dried aluminum strips and clamped to make lap-shear specimens after it was ground to a tan powder. The specimens were cured 2 hr./100° C, including 10 min. vacuum stripping at 29.5 inches after the first 20 min, postcured 2 hrs./150° C and tested for lap-shear strength according to ASTM D1002. The sample showed a lap-shear strength of 1100 psi.

EXAMPLE 16

TMBP-DGE in Powder Coating Applications

TMBP-DGE prepared according to Example 1 was ground in a micropulverizer to a particle size less than 100 microns. Eighty parts of the TMBP-DGE were blended with 20 parts of 4,4'-methylene dianiline. One pound of material was prepared. A GEMA AG laboratory electrostatic spray gun was used to evaluate the product as powder coatings. The powder was electrostatically sprayed onto steel panels. The coated panels were placed in a 190° C oven for 30 minutes for curing. No smoking or discoloration was noted and the coating was acetone insensitive indicating a complete cure. Adherence was good.

EXAMPLE 17

Extended TMBP-DGE.

TMBP-DGE (30g, 0.08m) prepared according to the procedure of Example 1 and having an epoxide equivalent of 188 and methylene dianiline (MDA) (2g, 0.01m) were reacted as follows. The diglycidyl ether was melted at 110° C. MDA was added at 110° C. while the melt was stirred well. The reaction was carried out for 3 hours 10 min. at 120°-125° C. The product was a viscous light amber melt at 125° C which solidified to yield a clear brittle resin at room temperature. Analysis indicated that the extended TMBP-DGE has an epoxide equivalent of 274, a reduced viscosity of 0.067 (0.2% $CHCl_3$) and a melting point of 67°-77° C.

I claim:

1. A curable mixture comprising a glycidyl ether which is the condensation product of a halohydrin and 3,3',5,5'-tetramethyl-4,4'-dihydroxybiphenyl and a curing agent selected from the class consisting of methylene dianiline and m-phenylene diamine.

2. The product obtained by curing the mixture of claim 1.

3. A curable mixture comprising a glycidyl ether which is the condensation product of a halohydrin and 3,3',5,5'-tetramethyl-4,4'-dihydroxybiphenyl and, as curing agent, methylenedianiline.

4. The product obtained by curing the mixture of claim 3.

* * * * *

UNITED STATES PATENT AND TRADEMARK OFFICE
CERTIFICATE OF CORRECTION

PATENT NO. : 4,072,656

DATED : February 7, 1978

INVENTOR(S) : Ludwig A. Hartmann

It is certified that error appears in the above—identified patent and that said Letters Patent are hereby corrected as shown below:

Column 7, line 43, after 200°C add --Pressures may vary from about 100 psi. to 1,000 psi.--

Column 11, line 54, "0 g" should read --10 g--.

Signed and Sealed this

Sixth Day of June 1978

[SEAL]

Attest:

RUTH C. MASON
Attesting Officer

DONALD W. BANNER
Commissioner of Patents and Trademarks